US006876599B1

(12) United States Patent
Combee

(10) Patent No.: US 6,876,599 B1
(45) Date of Patent: Apr. 5, 2005

(54) SEISMIC DATA ACQUISITION AND PROCESSING METHOD

(75) Inventor: Leendert Combee, Oslo (NO)

(73) Assignee: WesternGeco, L.L.C., Houston, TX (US)

( * ) Notice: Subject to any disclaimer, the term of this patent is extended or adjusted under 35 U.S.C. 154(b) by 433 days.

(21) Appl. No.: 10/110,832

(22) PCT Filed: Oct. 5, 2000

(86) PCT No.: PCT/IB00/01426

§ 371 (c)(1),
(2), (4) Date: Apr. 17, 2002

(87) PCT Pub. No.: WO01/29580

PCT Pub. Date: Apr. 26, 2001

(30) Foreign Application Priority Data

Oct. 21, 1999 (GB) .............................. 9924987

(51) Int. Cl.⁷ .............................. G01V 1/36; G01V 1/38
(52) U.S. Cl. .......................................... 367/21; 367/20
(58) Field of Search .............................. 367/15, 20, 21, 367/38

(56) References Cited

U.S. PATENT DOCUMENTS 4,809,235 A * 2/1989 Dragoset, Jr. ................. 367/21
5,050,129 A * 9/1991 Schultz ......................... 367/21
5,351,218 A 9/1994 Hatteland et al. ............. 367/20
6,049,507 A * 4/2000 Allen ........................... 367/21
6,151,556 A * 11/2000 Allen ........................... 367/23

FOREIGN PATENT DOCUMENTS

WO        WO 97/25632      7/1997

* cited by examiner

Primary Examiner—Ian J. Lobo
(74) Attorney, Agent, or Firm—WesternGeco, L.L.C.

(57) ABSTRACT

A method of acquiring and processing seismic data including: acquiring digitized seismic data associated with a plurality of receiver points using a plurality of moving seismic sensors; attenuating noise in the moving receiver point based digitized seismic data using digitized seismic data associated with a plurality of nearby receiver points; transforming noise attenuated moving receiver point based digitized seismic data into stationary receiver point based digitized seismic data; and recording noise attenuated and transformed digitized seismic data associated with stationary receiver points having an average spatial separation interval at least twice the average moving receiver point spatial separation interval. This method is particularly effective at attenuating coherent low frequency noise and correcting for the receiver motion effect in marine seismic data.

15 Claims, 3 Drawing Sheets

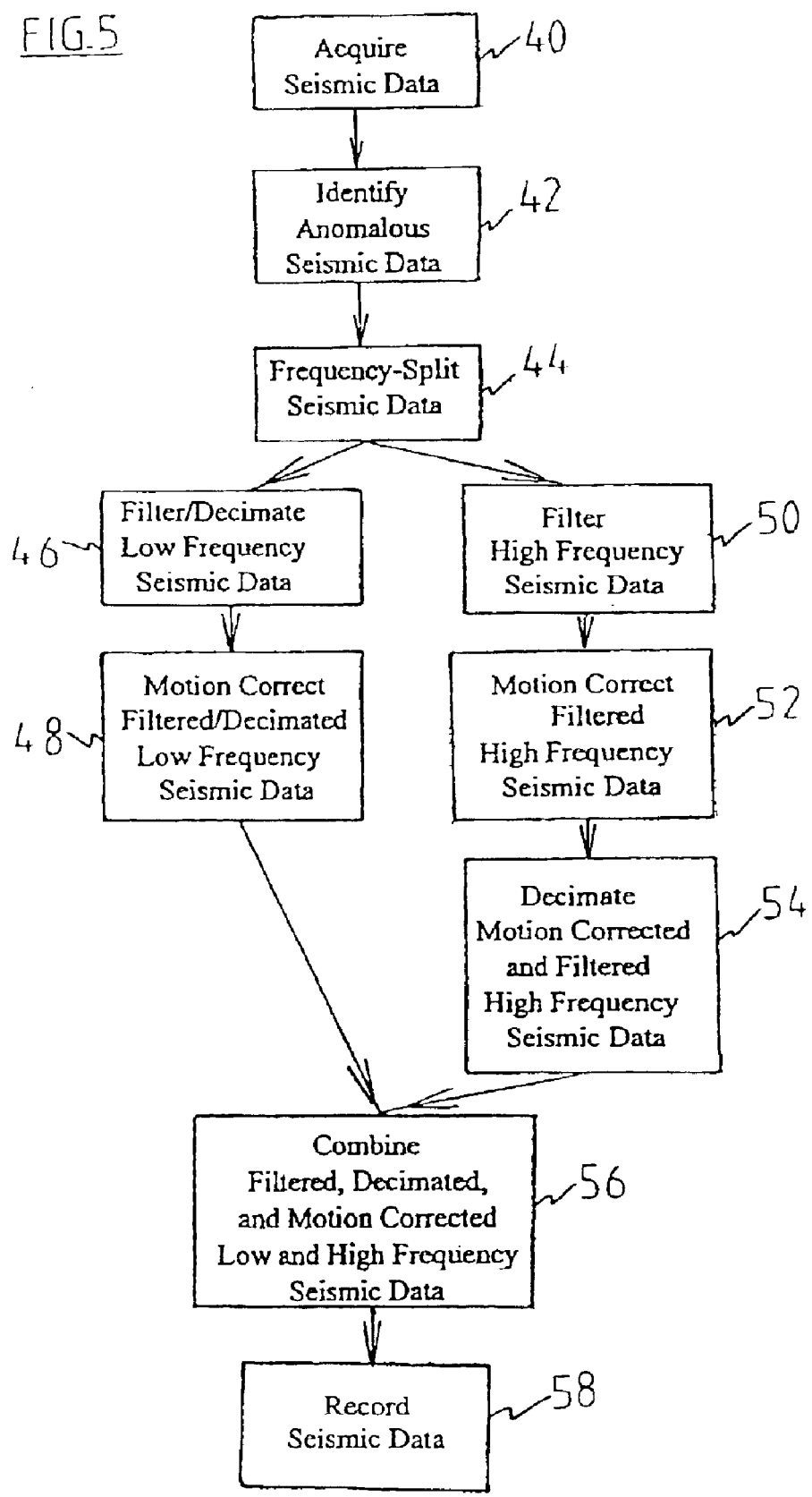

SEISMIC DATA ACQUISITION AND PROCESSING METHOD

This invention relates to seismic surveying, and is more particularly concerned with a seismic data acquisition and processing method adapted for use in situations where moving seismic sensors acquire the seismic data, such as during marine seismic surveying.

BACKGROUND OF THE INVENTION

In order to perform a 3D marine seismic survey, an array of seismic streamers, each typically several thousand meters long and containing arrays of seismic sensors (typically hydrophones) and associated electronic equipment distributed along its length, is towed at about 5 knots behind a seismic survey vessel, which also tows one or more seismic sources (typically air guns). Acoustic signals produced by the seismic sources are directed down through the water into the earth beneath and are reflected at interfaces where acoustic impedances of the differing geologic strata change. The reflected signals are received by the seismic sensors in the streamers, digitized and then transmitted to the seismic survey vessel, where they are recorded and at least partially processed with the ultimate aim of building up a representation of the earth strata in the area being surveyed.

Usually up to 12 streamers are towed, each of which is typically several kilometers long. The streamers are made up of sections that may be 100–200 meters in length; each section consists of hydrophones inside an outer skin that may be filled with oil, foam, or a more solid substance. Stress-wires and spacers form the internal skeleton of the streamer.

Marine seismic surveys are typically conducted to identify and characterize potential hydrocarbon deposits. The area being explored is generally subdivided into a number of cells or bins, using a gridding process. In 3D seismic surveys, these cells or bins are typically rectangular and have an in-line dimension (generally in the direction that the streamers are towed) and a cross-line dimension (generally perpendicular to the direction that the streamers are towed).

When designing a seismic survey, the resolution or granularity of the seismic image desired must be balanced against the cost of acquiring and processing the seismic data. If the same quantity of seismic data is acquired and processed for each bin, a seismic survey performed using a 12.5×12.5 meter bin size may cost up to 8 times more than a similar seismic survey performed using a 25×50 meter bin size. The parameter that quantifies the quantity of seismic data acquired for each bin is known as the "fold" of the seismic survey. Marine seismic surveys performed in connection with the exploration of a new geologic area or basin may have a relatively large bin size (such as 50×50 meters), while seismic surveys performed in connection with reservoir characterization or monitoring activities may have a relatively small bin size (such as 12.5×25 meters). Although some marine seismic data acquisition systems are able to acquire seismic data with in-line bin dimensions as small as 6.25 meters, the vast majority of seismic surveys are currently conducted with in-line bin dimensions of 12.5 meters or larger.

The seismic image of the subsurface will be contaminated or blurred by various types of noise in the seismic data acquired by the seismic sensors. In seismic data acquired by towed streamers, this noise can include ambient noise such as boundary layer turbulence, cross-flow noise and, in particular, swell noise and bulge wave (or breathing wave) noise. The main technique currently used to reduce this type of noise involves the creation of hydrophone groups by hardwiring series of adjacent hydrophones together to sum their respective analog output signals: typically a group contains between 6 and 12 uniformly-spaced hydrophones, and the centers of the groups are typically spaced at 6.25 meter or 12.5 meter intervals. Such an arrangement is disclosed in our U.S. Pat. No. 5,351,218, which also describes how pairs of adjacent groups can be selectively connected together to form groups of adjacent hydrophones whose group centers are spaced at 12.5 meter intervals.

Since the individual hydrophones in each group are fairly closely spaced, at approximately one meter apart on average, it is assumed that all the hydrophones in a given group receive substantially the same seismic signal. The seismic signal is therefore reinforced by the summing of the analog output signals of the hydrophones of the group, while the noise affecting each hydrophone, if it is randomly uncorrelated, will tend to be cancelled out by the summing process.

However, a great deal of the ambient noise in marine seismic data is not truly random in relation to the hydrophone groups of the prior art, so that the summing of the analog output signals of the hydrophones in each group is not effective at reducing it.

More sophisticated methods for attenuating noise in acquired seismic data are known. The best noise attenuation methods utilize filters having responses that vary in accordance with the spatial and/or temporal spectral content of the seismic data. A method using such filters is disclosed in our published PCT Patent Application No PCT/GB97/00055 entitled "Noise Filtering Method for Seismic Data". While the filters utilized by these methods offer the greatest degree of noise attenuation while preserving the desired signal, they tend to be extremely CPU intensive, both to derive the filters and to apply them, and are therefore difficult and expensive to implement in the field (on the seismic vessel for instance).

One method that may be used to reduce the computational effort required to implement these types of noise attenuation methods utilizes the fact that the in-line bin dimension of the seismic survey is often significantly greater than the spatial separation intervals between the hydrophones or hardwired hydrophone groups used to acquire the seismic data. If, for instance, a streamer has hydrophone groups having group centers with 6.25 meter spatial sampling intervals and the in-line bin dimension of the seismic survey is 25 meters, the noise attenuation method may be applied in such a way as to produce noise attenuated seismic data having a spatial sampling interval that matches this desired in-line bin dimension. This type of selective application of the noise attenuation method (i.e. producing filtered output traces for each bin, rather than for each input trace) can result in a four-fold, or more, reduction in the computational effort required.

A different type of signal-related noise or perturbation (also sometimes referred to as 'noise behind the signal') that may be observed in marine seismic data (and other types of seismic data acquired using seismic sensors that move with respect to the subsurface) is known as the receiver motion effect. Many seismic data processing algorithms assume that the seismic data being processed is associated with a particular fixed seismic source point and a particular fixed seismic sensor (or receiver) point. This assumption is not met, however, when seismic data is acquired using towed streamers because the location of each of the sensors is constantly changing as the seismic data is acquired.

Often this spatial smearing effect is ignored, but it can be shown that (supposedly) adjacent 10 second records acquired using vessel sailing lines in opposite directions may contain seismic data associated with receiver points separated by up to 50 meters in the sailing line direction! Attempts have been made to correct for this receiver motion effect, such as through the use of the method described in our U.S. Pat. No. 5,050,129 (Schultz), issued Sep. 17, 1991 and entitled "Marine Seismic Data Conditioning". As noted in this reference, the acquired seismic data can be transformed from a moving co-ordinate system to the fixed co-ordinate system of the earth by applying a time-variant spatial filter to the data.

Prior art streamer motion correction methods have suffered from various problems, however. First, as noted in Schultz, spatial aliasing can occur if the spatial sampling frequency is too coarse. If a seismic streamer acquires seismic data with relatively large absolute wavenumbers (larger than 1/25 m, for example) at a 12.5 m spatial sample interval (not frequency, which =1/12.5), then this data will be aliased and applying a time-variant spatial filter to motion correct the data will smear these signals. This problem will be substantially worse if the seismic data has a 25-meter spatial sampling frequency. Water multiples at far offsets may show apparent velocities of between 1500 and 3000 meters/second and the high frequency portions of this signal (between 60–120 Hz) may, for instance, show this aliasing problem. Second, it can be shown that a two-point linear interpolation method, such as described in Schultz, fails to properly reduce the level of signal error in the passband frequencies caused by the receiver motion effect Third, these methods rely on proper attenuation of motion-independent ambient noise (such as swell noise and bulge-waves) by the sensor groups. If this noise is insufficiently attenuated, or happens to be very strong, it will be smeared along the streamer, contaminating the seismic signal ever further.

While effective noise attenuation and receiver motion correction are both desirable, the functional interaction between these processes must be carefully considered. If the seismic data is receiver motion corrected prior to being noise attenuated, the apparent source of the noise will be smeared and the noise attenuation method may be significantly less effective. If the noise attenuation method produces output data with a relatively large spatial sampling interval, receiver motion correcting the noise attenuated data may cause aliasing.

It is therefore an object of the present invention to provide an improved method for acquiring and processing seismic data.

An advantage of the present invention is that the digitized seismic data may be both effectively noise attenuated and transformed to a stationary receiver point coordinate system (i.e. receiver motion corrected).

SUMMARY OF THE INVENTION

Accordingly there is provided a method of acquiring and processing seismic data comprising the steps of: acquiring digitized seismic data associated with a plurality of moving receiver points using a plurality of seismic sensors; attenuating noise in the digitized seismic data using digitized seismic data associated with a plurality of nearby receiver points; transforming the moving receiver point based digitized seismic data into stationary receiver point based digitized seismic data; and recording noise attenuated and transformed digitized seismic data associated with stationary receiver points having an average spatial separation interval at least twice the average moving receiver point spatial separation interval.

Features of the invention, preferred embodiments and variants thereof, possible applications and their advantages will become appreciated and understood by those skilled in the art from the following detailed description and drawings.

DRAWINGS

Figure 3:
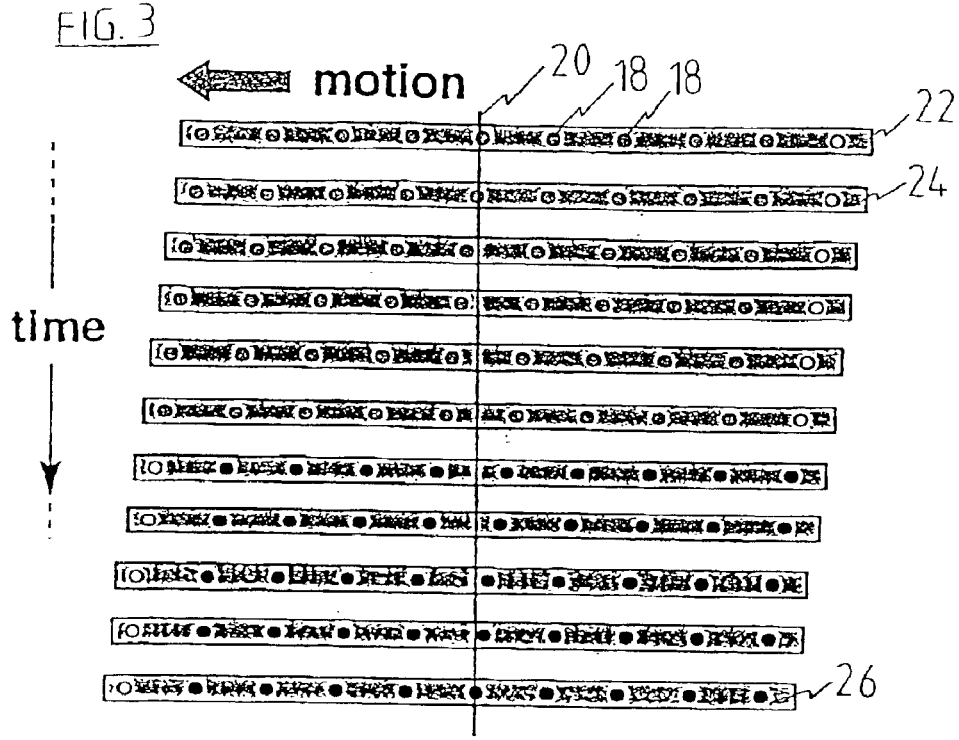
FIG. 3 illustrates the movement of seismic sensors in a streamer over time with respect to a fixed reference position.
Figure 4:
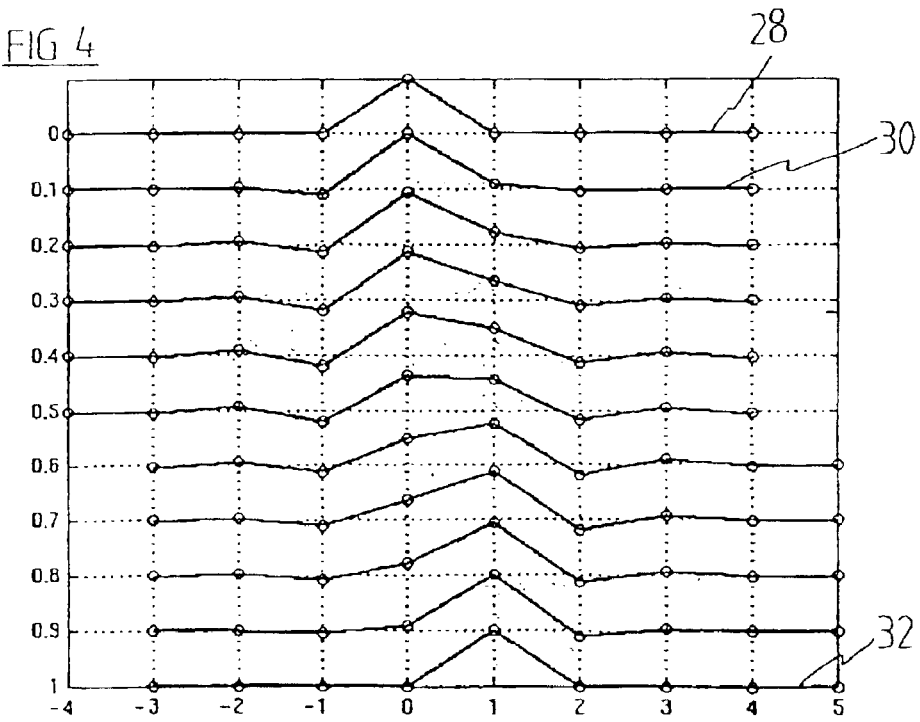

FIG. 4 graphically displays coefficients that may be applied to transform moving receiver point based seismic data acquired by the moving seismic sensors in FIG. 3 into stationary receiver point based digitized seismic data; and FIG. 5 is a flow chart showing steps associated with an embodiment of the present method.

MODE(S) FOR CARRYING OUT THE INVENTION

Figure 1:
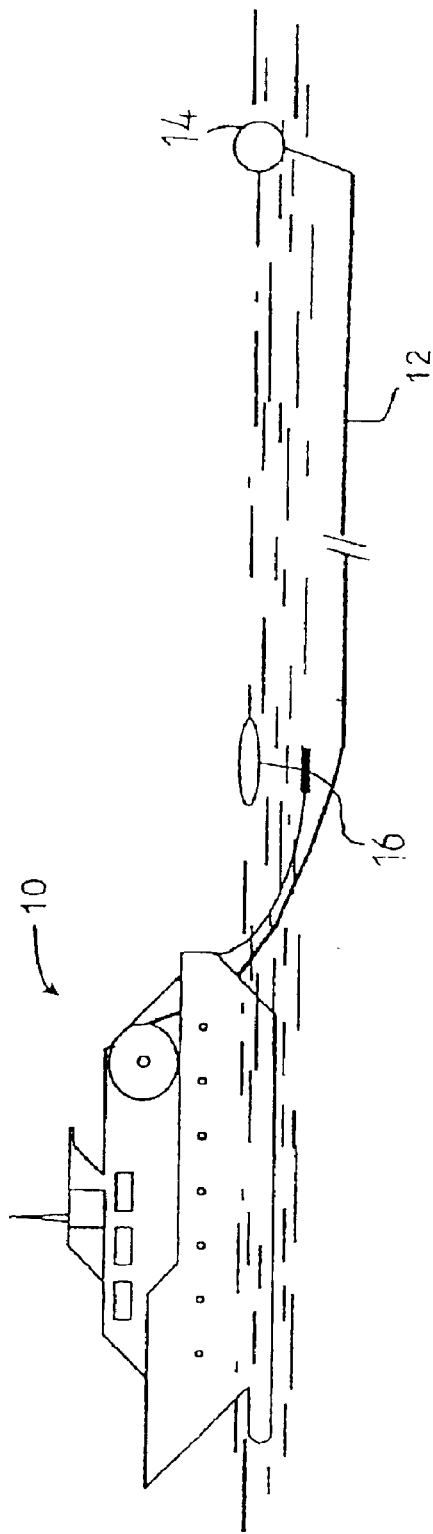
FIG. 1 is an illustration of a seismic survey vessel towing an exemplary seismic streamer.

FIG. 1 shows a seismic vessel towing an acoustic source and streamer through a body of water. The seismic vessel 10 pulls at least one seismic source 16 and at least one seismic streamer 12. The streamer 12 is secured to the vessel 10 by a lead-in cable that is attached to a cable storage reel located aboard the vessel. A tail buoy 14 is attached to the distal end of the cable by a long stretch of rope or similar material.

Figure 2:
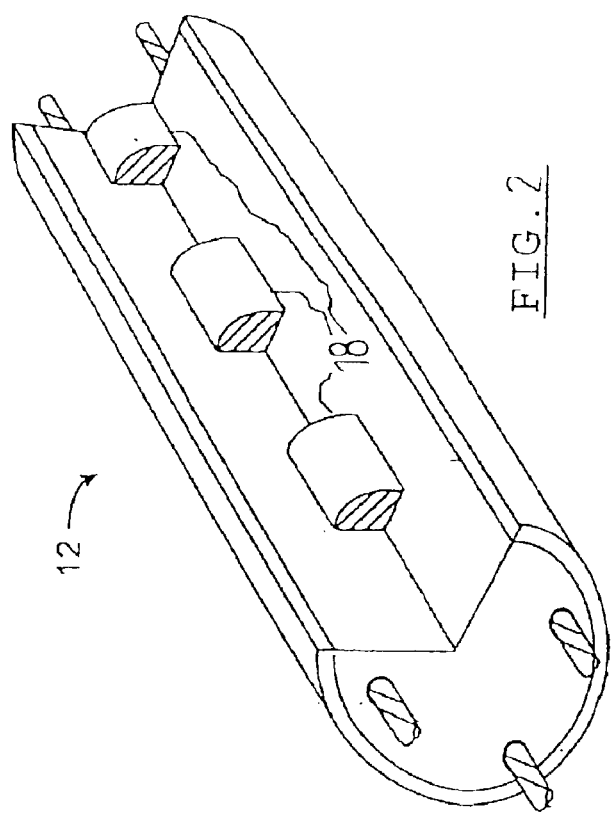
FIG. 2 is a schematic cross-section illustrating a portion of an exemplary streamer cable.

As shown in FIG. 2, each section of the streamer cable 12 contains a plurality of seismic sensors, such as hydrophones 18, that are well known in the seismic art. The hydrophones are interconnected by a transmission line (not shown) to a remote recording device located aboard the vessel. In this embodiment, adjacent hydrophones are not wired so as to form groups that generate a single output. Instead, each hydrophone generates a separate output that is subsequently processed as described below.

In FIG. 2, the seismic data acquired by each of the hydrophones 18 are individually digitized and available for subsequent processing. These hydrophones 18 are regularly spaced along the length of the action section of streamer 12 and have an average spatial separation interval of approximately 3.125 meters. While the present method is advantageously used in connection with this type of acquisition system, sometimes called a "single sensor" acquisition system, the method does not require the use of such a system. The method may also be used with conventional hardwired groups of seismic sensors, as long as the system acquires digitized seismic data having an average spatial separation interval that is relatively small, typically 6.25 meters or less and preferably less than 5 meters (i.e. the average distance separating the centers of adjacent hardwired sensor groups is less than 5 meters).

As the streamer cable is towed through the body of water, air guns 16 are fired and thus generate acoustic energy that travels through the water layer and the geologic formations beneath the ocean bottom. At various reflection points or planes, part of the acoustic energy is reflected back toward the surface. Hydrophones 18 in the streamer cable 12 receive the direct wavefield and any reflected or refracted wavefield traversing the streamer. The received wavefield is, in most cases, heavily contaminated by noise from various sources, as described above.

FIG. 3 shows how the seismic sensors shown in FIG. 2 move over time as the seismic data is acquired. As the marine seismic streamer 12 is towed, the hydrophones 18 are used to acquire digitized seismic data. Fixed reference position 20 represents a particular X, Y location on the earth's surface. Initial streamer position 22 shows that one particular seismic sensor, in this case the fifth hydrophone from the left, happens to be positioned at the fixed reference position 20 when a particular seismic data trace begins to be acquired.

Subsequent streamer position 24 shows that after a fraction of a second (here 0.1 second later than the time shown in initial streamer position 22) the fifth hydrophone has moved slightly to the left of the fixed reference position. This hydrophone continues to move in this direction until the point at which the sixth hydrophone from the left is now positioned at the fixed reference position 20 (at a time 1.0 second later than the time shown in the initial streamer position 22). This is shown in FIG. 3 as final streamer position 26. In that a seismic data trace will typically be several seconds in length, several hydrophones or hydrophone groups may be located at any particular fixed reference position (at different times of course) while a single set of seismic data traces are being acquired. For purposes of this discussion, it is assumed that the hydrophones are moving only in the in-line direction and have no movement in the cross-line direction.

The seismic acquisition electronics (either in-sea or onboard the seismic survey vessel 10) will acquire digitized seismic data from each of the hydrophones 18 (or each group of hydrophones), but this seismic data will be associated with moving receiver points, as discussed above. For the single sensor embodiment shown in FIGS. 2 and 3, the receiver points will be the locations of the hydrophones 18 themselves. If hardwired groups of hydrophones 18 are used, the receiver points will be the locations of the hydrophone group centers.

The digitized seismic data may be transformed from moving receiver point based digitized seismic data into stationary receiver point based digitized seismic data by using a time variant interpolation filter. While the two-point type of linear interpolation scheme described in Schultz will provide some degree of compensation for the receiver motion effect, an appropriate nine-point filter will provide significantly better results. Coefficients of a particular type of time-variant nine point filter that has been shown to yield less than a −40 dB error in the passband frequencies are graphically displayed in FIG. 4.

As shown in FIG. 4, when a particular hydrophone or hydrophone group center is located at the desired fixed reference location, the output data for this time sample will simply be the digitized value for that hydrophone or hydrophone group at that time. When no hydrophone or hydrophone group center is located at the desired fixed reference location, the output sample will be a weighted sum of the values from the nine nearest hydrophones or hydrophone groups at that time.

The Preferred Processing Sequence

FIG. 5 is a flowchart showing how this type of time-variant interpolation filter can be used as part of the inventive method. In the Acquire Seismic Data Step 40, the seismic source 16 is actuated and the seismic sensors, such as hydrophones 18, acquire seismic data which is then digitized, typically by analog-to-digital converters located near the hydrophones. The digitized seismic data is then screened in the Identify Anomalous Seismic Data Step 42. The purpose of the Identify Anomalous Seismic Data Step 42 is to identify dead or weak seismic data, abnormally high amplitude seismic data (spikes), and other types of anomalous data. This step may simply flag the anomalous seismic data so it may be subsequently processed differently than the other seismic data or steps may be taken to correct the seismic data at this point "Dead" (no amplitude) traces may, for instance, be replaced by synthetic traces generated by averaging traces adjacent to the dead trace. "Weak" (low amplitude) traces may, for Instance, be amplitude normalized. The seismic data may also be compensated for seismic sensor sensitivity variations during this step.

Frequency Split the Seismic Data

The digitized seismic data is then preferably frequency split in the Frequency-Split Seismic Data Step 44. The majority of coherent noise seen in marine seismic data is typically located between approximately 2 Hz and 30 Hz. The present invention utilizes the fact that a more sophisticated noise attenuation process is generally required for the lower frequency portions of the seismic data than for the higher frequency portions and that this lower frequency data is not subject to the same aliasing problems when it is subsequently receiver motion corrected using the time variant interpolation filter described above.

Preferably, the frequency splitting or band-splitting is performed using a Quadrature Mirror Filter or a Conjugate Mirror Filter. These types of methods are preferable because they have low reconstruction error, have relatively low computational cost, and to reduce the volume of data to be dealt with. Other types of frequency splitting techniques may also be used, such as by bandpass filtering and then decimating the data.

Quadrature mirror filtering splits one signal into two sub-signals, and allows the reconstruction of the original signal from them. The two sub-signals each have half the sampling rate, and (approximately) half the bandwidth of the original. The splitting and reconstruction process is exact and is relatively simple.

To split the signal, it is passed through two Finite Impulse Response filters (one high-pass, one low-pass) and then every other data point is removed. To recombine the two sub-signals, they are interpolated with alternate zeros, refiltered, and summed. This process can be repeated as often as required, so it is a simple matter to split the original signal into $2^n$ sub-signals. Additional information regarding quadrature mirror filtering may be found in the following article by M. J. T. Smith and T. P. Barwell III, Exact reconstruction techniques for tree-structure subband coders, *IEEE Trans. Acoust. Speech and Sig. Process.*, ASPP-34:434–411, 1986, incorporated herein by reference.

The digitized seismic data may, for instance, be split 3 times, i.e. taking 0256 Hz input samples and isolating the frequencies containing the predominant coherent noise observed in the marine seismic data (approximately 0–32 Hz). When using quadrature mirror filtering as the frequency splitting method, the time sampling interval of the seismic data would correspondingly increase, from 2 milliseconds to 16 milliseconds. Because the seismic traces are still the same time length (8 seconds for instance), this increase in the time sampling interval results in an 8-fold reduction in the data volume (i.e. the number of samples) to be noise attenuated.

Process the Low Frequency Portion

This low frequency seismic data is then preferably simultaneously filtered and spatially decimated in the Filter/

Decimate Low Frequency Seismic Data Step 46. An adaptive beamformer that uses digitized seismic data associated with a plurality of nearby receiver points is preferably used during this process.

An adaptive beamformer of the type described in our published European Patent Application EP0873528 A 199981028 entitled "Noise Filtering Method for Seismic Data", and further described in our PCT Application PCT/GB99101582 entitled "Adaptive Seismic Noise and Interference Attenuation Method", both incorporated herein by reference, is preferred. While in no way limiting the inventive method, example processing parameters for this method may include using seven input traces at 3.125 meter spacing, an 11-point filter length, an 83 point window length, and a 0.2 regularization factor. This type of noise attenuation method utilizes a filter bank that has a response that varies in accordance with the spatial and temporal spectral content of the input seismic data.

The output from the Filter/Decimate Low Frequency Seismic Data Step 46 will typically be decimated to the desired in-line spatial sampling interval (the in-line bin size dimension) by the above combined filtering/decimation method. If 3.125 meter spacing seismic data is acquired by a seismic streamer and the seismic survey has a 12.5 meter desired in-line spatial sampling interval, the seismic data output from the Filter/Decimate Low Frequency Seismic Data Step 46 will typically have a further four fold reduction in data volume from the data volume input into the noise attenuation process. This reduction in data volume is even more dramatic when it is considered that the data volume may have already been reduced by a factor of eight when the sampling interval was increased from 2 milliseconds to 16 milliseconds, as discussed above.

It is important to recognize that spatial aliasing of the seismic data in the frequency band of 0–32 Hz is not an issue at output spatial sampling intervals of up to 25 meters. Therefore low frequency noise attenuated data may typically be receiver motion corrected after spatial decimation to the desired output in-line spatial sampling interval (12.5 or 25 meters, for example). This output data is then motion corrected in the Motion Correct Filter/Decimated Low Frequency Seismic Data Step 48. This will transform the seismic data from moving receiver point based digitized seismic data to stationary receiver point based digitized seismic data and will typically involve applying a time-variant filter of the type shown in FIG. 4. It is important that the current spatial sampling interval and time sampling interval of the seismic data being receiver motion corrected be matched with time-variant interpolation filter coefficients that have been derived for this particular spatial sampling interval, time sampling interval, and receiver motion speed.

Process the High Frequency Portion

The other portion of the seismic data from the Frequency-Split Seismic Data Step 44, the relatively high frequency component(s)(from 33 to 256 Hz for instance) is typically first filtered (noise attenuated) in the Filter High Frequency Seismic Data Step 50. Significantly less coherent noise is typically seen in the high frequency component of marine seismic data and a more conventional filtering process is often applied to this portion of the seismic data, such as by applying a conventional KF filter that uses digitized seismic data associated with a plurality of nearby receiver points. To avoid aliasing problems during the motion correction step, the receiver motion correction should be applied to the data before spatial decimation. The spatial sampling interval of the filtered data produced by the Filter High Frequency Seismic Data Step 50 should be relatively small, generally 6.25 meters or less, and preferably less than 5 meters.

The filtered high frequency seismic data will then typically be motion corrected in the Motion Correct High Frequency Seismic Data Step 52 using the receiver motion correction process described above. Again, it is important that the current spatial sampling interval and time sampling interval of the seismic data be matched with time-variant interpolation filter coefficients that have been derived for this particular spatial sampling interval, time sampling interval, and receiver motion speed. The spatial and time sampling intervals of the high frequency portion of the seismic data after noise attenuation will typically be different from the spatial and time sampling intervals of the low frequency portion after noise attenuation. Therefore, different time-variant filter coefficients will typically be used to receiver motion correct the high frequency portion of the seismic data and the low frequency portion of the seismic data.

The filtered and motion corrected seismic data is then typically decimated in the Decimate Motion Corrected and Filtered High Frequency Seismic Data Step 54. In this step, the stationary receiver point spatial separation interval is typically increased from the spatial separation interval output from the Filter High Frequency Seismic Data Step 50 (often the spatial separation interval of the individual seismic sensors or hardwired seismic sensor groups) to the desired final output in-line separation interval (the desired in-line bin size dimension). This step may change the spatial separation interval of the data from 3.125 meters to 12.5 meters, for instance. This decimation process typically involves a stacking process (to increase the signal to noise ratio of the output data) where traces located within the desired output bin are combined in some way (with equal weights, with differential weights, etc.). Other types of known signal processing schemes can also be introduced at this point, such as normal moveout correction, diversity stacking, covariance stacking, etc.

Recombine the Low Frequency and High Frequency Portions

The output from the Motion Correct Filtered/Decimated Low Frequency Seismic Data Step 48 and the Decimate Motion Corrected and Filtered High Frequency Seismic Data Step 54 are merged in the Combine Filtered, Decimated, and Motion Corrected Low and High Frequency Seismic Data Step 56. This step may be performed using the Inverse Quadrature Mirror Filter reconstruction technique described above. This reconstruction process produces full bandwidth seismic data (0 to 256 Hz, for instance) that may be subjected to further seismic data processing techniques.

Record the Seismic Data

The noise attenuated and transformed digitized seismic data output from the Combine Filtered, Decimated, and Motion Corrected Low and High Frequency Seismic Data Step 56 is then recorded in the Record Seismic Data Step 58. As noted above, this seismic data will be associated with stationary receiver points that have an average spatial separation interval of at least twice the average moving receiver point spatial separation interval.

The present invention is based on the discovery that the while the bin size of the seismic survey can be increased or decreased based on the granularity of the seismic image required, the seismic wavefront must be sampled at a relatively dense spatial sampling frequency to allow for effective noise attenuation and to prevent aliasing during receiver motion correction. To effectively process the seismic data, the lower frequency components should be noise attenuated and the higher frequency components should be receiver motion corrected before the seismic data has been decimated to a relatively large spatial sampling interval.

The 3.125 meter receiver point spacing and single sensor data acquisition architecture shown in FIG. 2 represents only one of a vast number of alternative architectures that could be used with the present method. Commercially available streamers having 6.25 meter hardwired seismic sensor groups could also be used in connection with the inventive method to produce seismic data having 12.5 meter or larger output in-line bin dimensions, for instance.

Acquiring digitized seismic data associated with receiver points having an average spatial separation smaller than 3.125 meters would allow even a greater portion of the coherent noise to be properly characterized and attenuated. This would also affect the ratio between the input and the output spatial separation intervals. If digitized seismic data is acquired at an average spatial separation interval of 1.5625 meters, for instance, and the desired in-line bin dimension of the seismic survey is 25 meters, the stationary receiver points would have an average spatial separation interval that is 16 times the average moving receiver point spatial separation interval.

While the described embodiment utilizes hydrophones 18 as the seismic sensors, other types of seismic sensors may also be used, such as geophones or accelerometers. While the apparatus described in this application is a towed seismic streamer, it will be readily understood that the present method may be used whenever seismic data is acquired using moving seismic sensors, such as in seismic surveying using a moving ocean bottom cable or seismic sensors that are towed on land, such as over snow or sand. Seismic acquisition systems having irregular receiver point spatial separation intervals may be used as well.

Preferably steps 42 to 56 are performed on the seismic survey vessel 10. This allows the acquired seismic data to be recorded at the in-line bin size desired by the client without additional subsequent off-vessel seismic processing.

Both the Filter/Decimate Low Frequency Seismic Data Step 46 and the Filter High Frequency Seismic Data Step 50 typically attenuate noise in the moving receiver point based digitized seismic data using digitized seismic data associated with a plurality of nearby receiver points. Although it would be possible to utilize a noise attenuation method that processed data from only a single moving receiver point (such as by bandpass filtering the output from a single seismic sensor), this would often not result in effective noise attenuation and would likely be used only where the magnitude of the noise in the seismic data was quite limited (such as in the higher frequency components of marine seismic data).

While steps 44 to 56 are shown in FIG. 5 as distinct steps, it will be recognized that some of the steps could be implemented simultaneously or in different orders. If the high frequency seismic data is filtered using a simple bandpass filter in the Filter High Frequency Seismic Data Step 50, it does not matter whether the data is filtered first, motion corrected first, or whether the data is simultaneously filtered and motion corrected. By developing appropriate filter coefficients, it is also be possible to simultaneously filter and decimate the motion corrected high frequency seismic data.

Typically the noise attenuation method used to filter the high frequency seismic data is not nearly as CPU intensive as the noise attenuation method used to filter the low frequency data. It may therefor be desirable to perform steps 50, 52, and 54 on both the higher and lower frequency components of the seismic data, so the processed data may be compared with the output of the step 56, for instance. If both the higher and lower frequency components are processed through steps 50, 52, and 54, however, the lower frequency components should be eliminated before this seismic data is combined with the seismic data output from steps 46 and 48.

What is claimed is:

1. A method of acquiring and processing seismic data comprising the steps of:

acquiring digitized seismic data associated with a plurality of moving receiver points using a plurality of seismic sensors;

attenuating noise in said moving receiver point based digitized seismic data using digitized seismic data associated with a plurality of nearby said receiver points;

transforming said noise attenuated moving receiver point based digitized seismic data into stationary receiver point based digitized seismic data; and recording noise attenuated and transformed digitized seismic data associated with stationary receiver points having an average spatial separation interval at least twice an average moving receiver point spatial separation interval.

2. A method according to claim 1 further including the step of identifying anomalous seismic data prior to said attenuating step.

3. A method according to claim 1 further including the step of frequency band splitting said digitized seismic data into a low frequency portion and a high frequency portion.

4. A method according to claim 3 wherein said frequency band splitting is performed using a Quadrature Mirror Filter or a Conjugate Mirror Filter.

5. A method according to claim 3 wherein said low frequency portion's time sampling interval is increased as a result of said frequency band splitting.

6. A method according to claim 3 wherein said attenuating noise step is performed on said low frequency portion using an adaptive beamformer.

7. A method according to claim 3 wherein said attenuating noise step is performed on said low frequency portion using a filter bank that has a response that varies in accordance with the spatial and/or temporal spectral content of said low frequency portion.

8. A method according to claim 3 wherein said low frequency portion's spatial sampling interval is increased as a result of said attenuating noise step.

9. A method according to claim 3 wherein said attenuating noise step is performed on said high frequency portion using a KF filter.

10. A method according to claim 1 wherein said transforming step is performed using a time-variant filter having three or more points.

11. A method according to claim 3 where different time-variant filters are used to transform said low frequency portion and said high frequency portion of said digitized seismic data into stationary receiver point based digitized seismic data.

12. A method according to claim 3 further including the step of recombining said low frequency portion and said high frequency portion to produce said noise attenuated and transformed digitized seismic data.

13. A method according to claim 1 wherein said stationary receiver points have an average spatial separation interval that is four or more times larger than said average moving receiver point spatial separation interval.

14. A method according to claim 1 wherein said average moving receiver point spatial separation interval is approximately 6.25 meters or smaller.

15. A method according to claim 14, wherein said average moving receiver point spatial separation interval is smaller than 5 meters.

* * * * *